United States Patent
Ruppert, Jr. et al.

(10) Patent No.: US 6,374,933 B1
(45) Date of Patent: Apr. 23, 2002

(54) TRACK VEHICLE TRACK WIDTH ADJUSTMENT

(75) Inventors: Malcolm F. Ruppert, Jr., Cedar Falls, IA (US); Glenn Matusz, Silver Lake, OH (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/400,510

(22) Filed: Sep. 20, 1999

(Under 37 CFR 1.47)

(51) Int. Cl.[7] .............................................. B62D 55/00
(52) U.S. Cl. ................. 180/9.48; 180/9.44; 74/665 GC
(58) Field of Search .............................. 180/9.44, 9.48, 180/9.62; 74/607, 606 R, 665 GC

(56) References Cited

U.S. PATENT DOCUMENTS

| | | | |
|---|---|---|---|
| 1,413,148 A | * 4/1922 | Wickersham | 180/9.62 |
| 1,710,116 A | 4/1929 | Sembera | |
| 1,736,391 A | * 11/1929 | Christie | 180/9.62 |
| 2,352,086 A | * 6/1944 | Eberhard | 180/9.62 |
| 2,535,762 A | 12/1950 | Tapp et al. | |
| 2,618,349 A | 11/1952 | Ludema | |
| 2,650,104 A | 8/1953 | Grace | |
| 2,681,231 A | 6/1954 | Kondracki | |
| 2,693,634 A | * 7/1954 | Herr, Jr. | 180/9.62 |
| 2,797,763 A | * 7/1957 | Blesener | 180/9.48 |
| 2,894,341 A | 7/1959 | Amthor et al. | |
| 3,393,758 A | * 7/1968 | Helm et al. | 180/9.48 |
| 3,494,439 A | 2/1970 | Kline | |
| 3,674,105 A | 7/1972 | Egli | |
| 3,712,398 A | 1/1973 | Althaus | |
| 3,749,193 A | 7/1973 | Blase et al. | |
| 3,894,598 A | 7/1975 | Yeou | |
| 3,998,286 A | 12/1976 | Ponikelsky et al. | |
| 4,132,317 A | 1/1979 | Arendt et al. | |
| 4,431,074 A | 2/1984 | Langerud | |
| 4,448,273 A | 5/1984 | Barbieri | |
| 4,457,388 A | 7/1984 | Koehler et al. | |
| 4,574,900 A | * 3/1986 | Aoki et al. | 180/9.62 |
| 5,598,896 A | 2/1997 | Haest | |
| 5,607,210 A | 3/1997 | Brazier | |
| 5,638,908 A | 6/1997 | Masumoto et al. | |
| 5,924,503 A | * 7/1999 | Lykken | 180/9.44 |
| 6,176,334 B1 | * 1/2001 | Lorenzen | 180/9.48 |

* cited by examiner

*Primary Examiner*—Daniel G. DePumpo
(74) *Attorney, Agent, or Firm*—Foley & Lardner

(57) ABSTRACT

A system for adjusting the width of a tracked vehicle is described including a rear suspension having a differential that drives two spur gears with rotational axes located above the differential and adapted to slidingly support two drive axles.

10 Claims, 4 Drawing Sheets

TRACK VEHICLE TRACK WIDTH ADJUSTMENT

FIELD OF THE INVENTION

The invention relates generally to agricultural vehicles that use tracks. More particularly it is directed to structures for adjusting the lateral spacing of tracked suspensions in such vehicles.

BACKGROUND OF THE INVENTION

Agricultural vehicles using tracks instead of wheels are difficult to adjust. Changing the lateral spacing between the tracks may require substantial disassembly of the tracked suspensions. It would be beneficial to provide a tracked suspension that is more easily adjustable to vary the lateral spacing of the tracks. It is an object of this invention to provide such a suspension.

SUMMARY OF THE PRESENT INVENTION

In accordance with a first embodiment a rear suspension for a tracked vehicle is provided including a differential case, a differential pinion gear for receiving rotational power from a prime mover, a driving gear gearingly coupled to and driven by the differential pinion, a differential carrier fixed to the driving gear, at least two pinion gears coupled to the differential carrier to permit relative rotation with respect to the differential carrier, two laterally opposed side gears adapted to rotate about a rotational axis and supported by the differential carrier for relative rotation with respect to the differential carrier and wherein the at least two pinion gears are adapted to drive the two laterally opposed side gears, first and second spur gears rotatable about the rotational axis wherein each of said first and second spur gears is coupled to and driven by a respective one of the two laterally opposed side gears, third and fourth spur gears with respective second and third rotational axes, the third and fourth gears engaged to and driven by the first and second spur gears, respectively, wherein the second and third rotational axes extend across a top portion of the differential case, and first and second splined drive axles each having an inner and an outer end and wherein the first drive axle splines are slidingly supported within and driven by the third spur gear and the second drive axle splines are slidingly supported within and driven by the fourth spur gear. The first, second, third and fourth spur gears may be supported within the differential case. Each of the third and fourth spur gears may be disposed adjacent to openings in the differential case to permit the drive axles to pass through the differential case. The third and fourth spur gears may also include splines disposed outboard of the third and fourth spur gear teeth. The outer end of the first and second drive axle may be coupled to a drive wheel for driving an endless track.

In accordance with a second embodiment, a rear suspension is provided, having a differential case, a differential pinion gear for receiving rotational power from a prime mover, a differential gear set supported within the differential case, first and second spur gears rotatable about the rotational axis disposed on opposing sides of the differential gear set and differentially driven by the differential gear set, third and fourth spur gears rotationally engaged with and driven by the first and second spur gears, respectively, wherein the rotational axes of the third and fourth spur gears lie in a horizontal plane and are substantially parallel to each other, and first and second splined drive axles each having an inner and an outer end and wherein first drive axle splines are slidingly supported within and driven by the third spur gear and second drive axle splines are slidingly supported within and driven by the fourth spur gear. The first and second drive axle splines are preferably of sufficient length and the rotational axes are sufficiently far apart to permit the inner ends of the first and second drive axles to be inserted through the third and fourth spur gears, respectively, and to lie side-by-side without axle-to-axle interference. The third and fourth spur gears may be disposed within and rotationally supported by the differential case. The suspension may further include first and second drive wheels coupled to and rotating coaxially with the outer ends of the first and second drive axles, respectively. The suspension may further include first and second endless tracks wrapped about and driven by first and second drive wheels, respectively. The first drive axle may include first inner and outer flexible couplings, the first inner flexible coupling being disposed in the first drive axle adjacent to the third spur gear, and the first outer flexible coupling being disposed in the first drive axle adjacent the first drive wheel, and wherein the second drive axle includes second inner and outer flexible couplings, the second inner flexible coupling being disposed in the second drive axle adjacent to the fourth spur gear, and the second outer flexible coupling being disposed in the second drive axle adjacent the second drive wheel.

In accordance with a third embodiment of the invention, a tracked agricultural vehicle is provided, having a frame, an engine coupled to the frame, a first differential case including a first differential gear set and first and second spur gears driven by the differential gear set wherein the first and second spur gears are disposed on opposing sides of the differential case and have substantially parallel and horizontal rotational axes that are disposed above the differential gear set, first and second drive axles slidingly engaged and coaxial with the first and second spur gears and extending laterally away from the vehicle on opposing sides of the vehicle, first and second drive wheels fixed to an outer end of the first and second drive axles, respectively and sharing a common rotational axis with the first and second drive axles, first and second tracks each having a wrapped portion wrapped around the third and fourth drive wheel, respectively, and further having a forwardly extending portion extending from the wrapped portion downward and forward and away from its respective drive wheel, and further having a rearwardly extending portion extending from the wrapped portion downward and forward and away from its respective drive wheel. The vehicle may also include a second differential case including a second differential gear set and third and fourth spur gears driven by the differential gear set wherein the third and fourth spur gears are disposed on opposing sides of the differential case and have substantially parallel and horizontal rotational axes disposed above the differential gear set, third and fourth drive axles slidingly engaged and coaxial with the third and fourth spur gears and extending laterally away from the vehicle on opposing sides of the vehicle, third and fourth drive wheels fixed to an outer end of the third and fourth drive axles, respectively, and sharing a common rotational axis with the third and fourth drive axles, third and fourth tracks having a wrapped portion wrapped around the third and fourth drive wheel, respectively; and further having a forwardly extending portion extending from the wrapped portion downward and forward and away from its respective drive wheel, and further having a rearwardly extending portion extending from the wrapped portion downward and forward and away from its respective drive wheel. The first differential case may be disposed at the front of the vehicle and the second differential gear box may be disposed at the rear of the vehicle. The first and second drive axles may also include at least a first and second flexible coupling disposed in the first and second drive axles, respectively. The first and second drive axles may include at least a first and second flexible coupling disposed in each of the first and second drive axles, respectively, wherein the first flexible couplings are disposed in each of the first and second drive axles adjacent to the first and second spur gears, and the second flexible couplings are disposed in each of the first and second drive axles adjacent to the drive wheels.

Other principal features and advantages of the invention will become apparent to those skilled in the art upon review of the following drawings, the detailed description and the appended claims.

Figure 1:
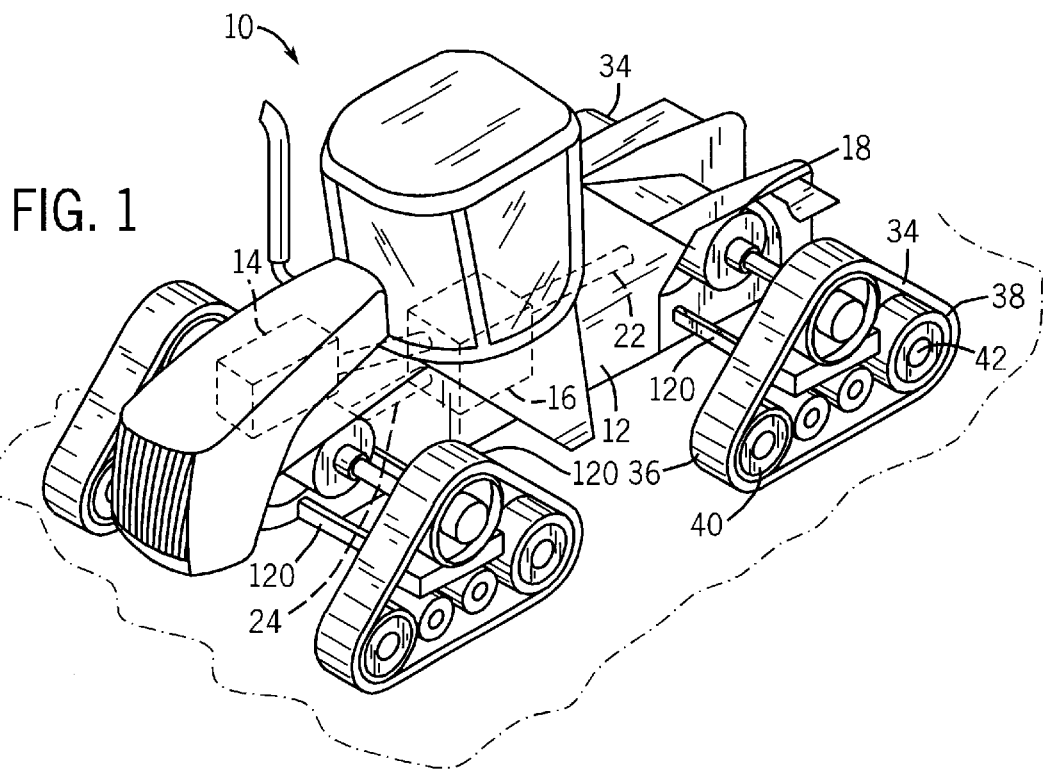
FIG. 1 illustrates a tracked agricultural vehicle in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
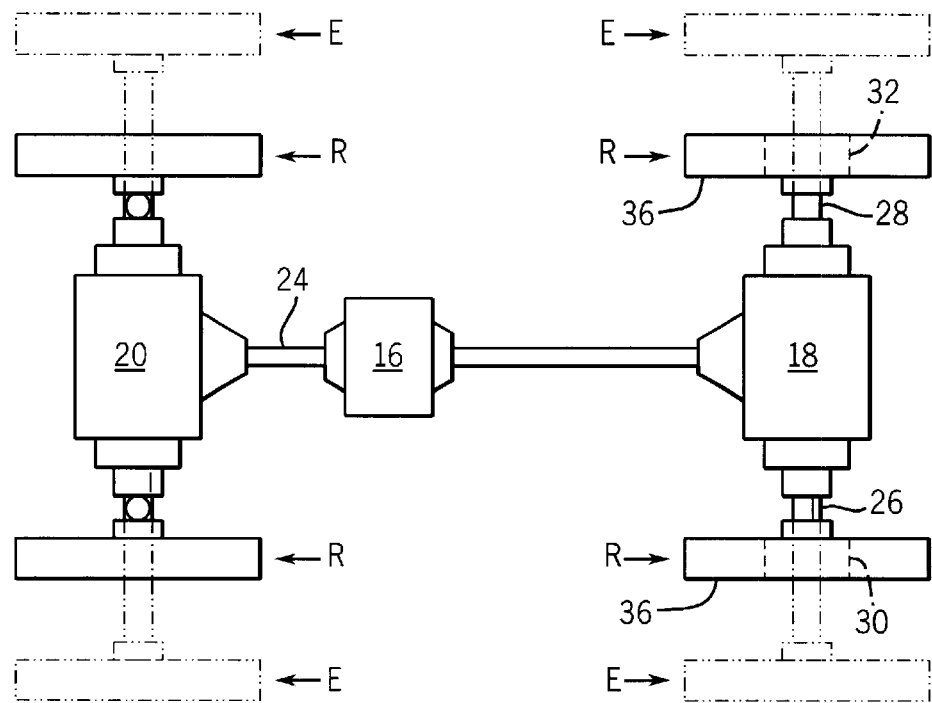
FIG. 2 shows the front and rear suspensions of the agricultural vehicle of FIG. 1 with the front and rear suspensions in both retracted and extended positions.

Referring to Referring to FIGS. 1 and 2, a tracked agricultural vehicle 10 is shown having a frame 12 on which an engine 14 is mounted. Engine 14 is coupled to a transmission 16 which transmits the engine's power both to a rear differential 18 and a front differential 20 via driveshafts 22 and 24, respectively. The discussion that follows is directed to a rear track drive for convenience. A similar track drive arrangement is also used at the front of the vehicle.

Two drive axles 26 and 28 are driven by, and extend laterally away from, rear differential 18 and are coupled to drive wheels 30 and 32 disposed on either side of the vehicle. Each of the drive wheels is wrapped by a portion of an associated endless track 34. A forward portion 36 of each track extends downwardly and forwardly from its associated drive wheel. A rearward portion 38 of each track extends downwardly and rearwardly from its associated drive wheel. The forward portion 36 of each track wraps around a forward idler wheel 40 disposed below and forward of its associated drive wheel. The rearward portion 38 of each track wraps around a rearward idler wheel 42 that is disposed below and behind its associated drive wheel. A ground-engaging portion 44, of each track is disposed below and between the forward and rearward idler wheel.

Power applied to the drive wheel is communicated to the portion of the track in contact with the drive wheel causing the track to rotate in a continuous loop around the drive wheel, the forward idler wheel, the rearward idler wheel and back to the drive wheel, thus driving the vehicle forward over the ground. Thus, the rear differential differentially drives two ground-engaging tracks, one disposed on either side of the vehicle. A similar arrangement of drive wheel, idler wheels, roller wheels drive and track is provided for all four track drives of the vehicle.

Referring to FIG. 2, the front and rear differential arrangement of vehicle 10 with associated track drives is shown with drive wheels 30 and 32 in two alternative adjustment positions, extended position E and retracted position R. These two positions illustrate two of many possible adjustment positions. In operation, drive wheels 30 and 32 and associated tracks on both sides of the vehicle would typically be positioned the same distance from the differential, assuming the differential is disposed in the center of the vehicle. The front drive wheels would be similarly positioned such that the front and rear drive wheels on each side of the vehicle and their associated tracks travel in the same lateral position over the ground.

Figure 3:
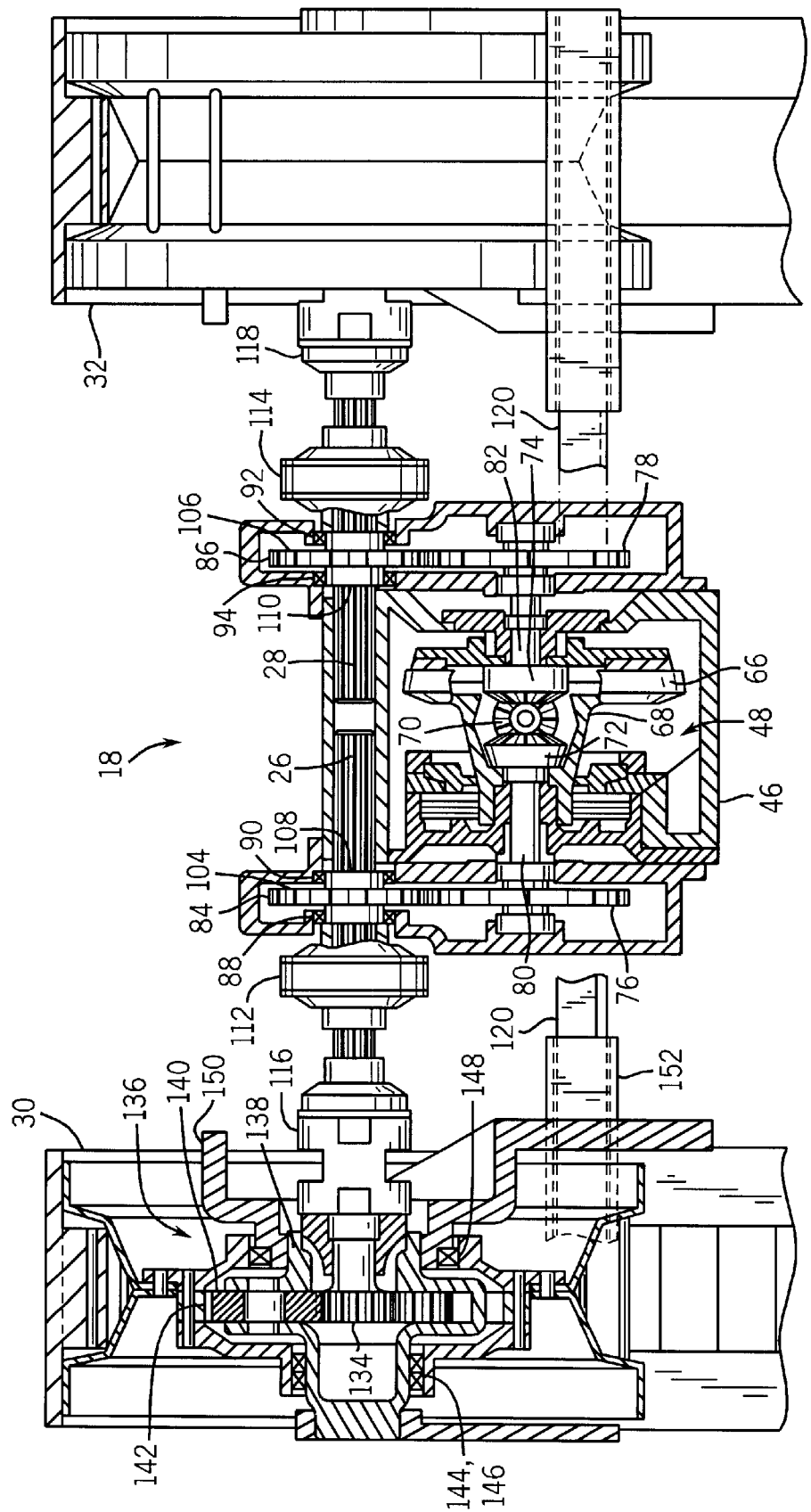
FIG. 3 shows a differential and two track drives of the agricultural vehicle of FIGS. 1 and 2 in partial cross-sectional view that employs drive axles with flexible couplings disposed in a central portion of the drive axles to permit the drive axles to flex.

Referring to FIGS. 2 and 3, the rear differential 18 includes a differential case 46 that houses a differential gear set 48 and four spur gears disposed to permit drive axles 26 and 28 to extend across a top portion of differential case 46 without interfering with each other. The differential gear set 48 includes a differential pinion gear (not shown) that is coupled to and driven by driveshaft 22.

In operation, power is transmitted from engine 14 to transmission 16. Drive shaft 22 transmits power from transmission 16 to rear differential 18. The pinion gear is coupled to drive shaft 22 and, in turn drives driving (or ring) gear 66. Ring gear 66 is fixed to differential carrier 68 and drives it. Differential carrier 68 drives two pinion gears 70 (only one is shown in FIG. 3) that are supported in rotation by, and rotate with respect to, differential carrier 68. Pinion gears 70 are engaged to and drive side gears 72 and 74. Side gears 72 and 74 are coupled to lower spur gears 76 and 78 by shafts 80 and 82, which transmit rotational power from side gears 72 and 74 to lower spur gears 76 and 78, respectively. Lower spur gears 76 and 78 are engaged with and drive upper spur gears 84 and 86, respectively. Upper spur gears 84 and 86 are disposed in differential case 46 such that their respective axes of rotation are substantially parallel, horizontal and extend laterally from case 46.

Upper spur gears 84 and 86 are supported for rotation within differential case 46 by bearings 88, 90 and 92, 94, respectively. Upper spur gears 84 and 86 have splined holes through which drive axles 26 and 28 are inserted, respectively. The inner surface of these splined holes mate with splines on the outer surface of drive axles 26 and 28, respectively, to transmit torque to drive axles 26 and 28. The mating splines have sufficient clearance to permit drive axles 26 and 28 to be slid in or out with respect to spur gears 84 and 86 to a plurality of splined engagement positions. This permits the drive axles and their associated drive wheels 30 and 32 to be moved inward toward the vehicle or outward away from the vehicle. Upper spur gears 84 and 86 have planar portions 104 and 106 fixed to hollow cylindrical portions 108 and 110, and are supported by four bearings 88, 90 and 92, 94 mounted in spaced apart relation on the cylindrical portion, one near the inner end of cylindrical portions 108 and 110 and one near the outer end of cylindrical portions 108 and 110. These bearings support spur gears 84, 86 with respect to differential case 46.

The axes of rotation of upper spur gears 84 and 86 are preferably collinear (i.e. sharing substantially the same axis of rotation), or more preferably are offset, one forward and one aft in a substantially horizontal plane. Since the holes passing through the spur gears are preferably coaxial with the axes of rotation as well as coaxial with the drive axles inserted into the holes, this hole arrangement offsets drive axle 26 and drive axle 28 such that the rotational axis of one axle is forward of the rotational axis of the other, yet both axles are still substantially parallel and both lie in a substantially horizontal plane. The axle offset is large enough to permit the inner ends of drive axles 26 and 28 to pass through upper spur gears 84 and 86 and to lie side-by-side without interfering with each other when the axles are driven in rotation. By laterally offsetting the axles, drive axles 26 and 28 can be inserted into or pulled out from upper spur gears 84 and 86 over a greater distance when the track drives are retracted or extended, since their ends will not abut. This provides greater adjustability of the track-to-track width without requiring the use of different drive axles.

Each of drive axles 26 and 28 is in the form of two rigid sections joined by a flexible couplings 112 and 114 at a central region of the axles. The coupling permits the drive axles to flex in that central region. In this manner, small misalignments of drive wheels 30, 32, with respect to differential 18 will not place a large bending load on spur gears 84, 86. Since the drive wheels and axles are. laterally adjustable with respect to the differential 18 it is a distinct possibility that such misalignments would occur.

To provide additional flexibility, second flexible couplings 116, 118 are preferably fixed to the outboard ends of drive axles 26 and 28, respectively, and are coupled to drive wheels 30 and 32 to transmit torques from drive axles 26 and 28 to their associated drive wheels 30 and 32 and to permit the outboard end of drive axles 26 and 28 to flex with respect to their associated drive wheels.

In the preferred embodiment, the vehicle's weight is supported on two laterally extending beams 120 associated with each of the vehicle's track drives and extending laterally away from the frame of the vehicle. Each track drive is slidably mounted on and supported by its associated pair of beams 120. The weight of the vehicle is transmitted from the frame, to the beams, to the track drive and thence to the ground.

Figure 4:
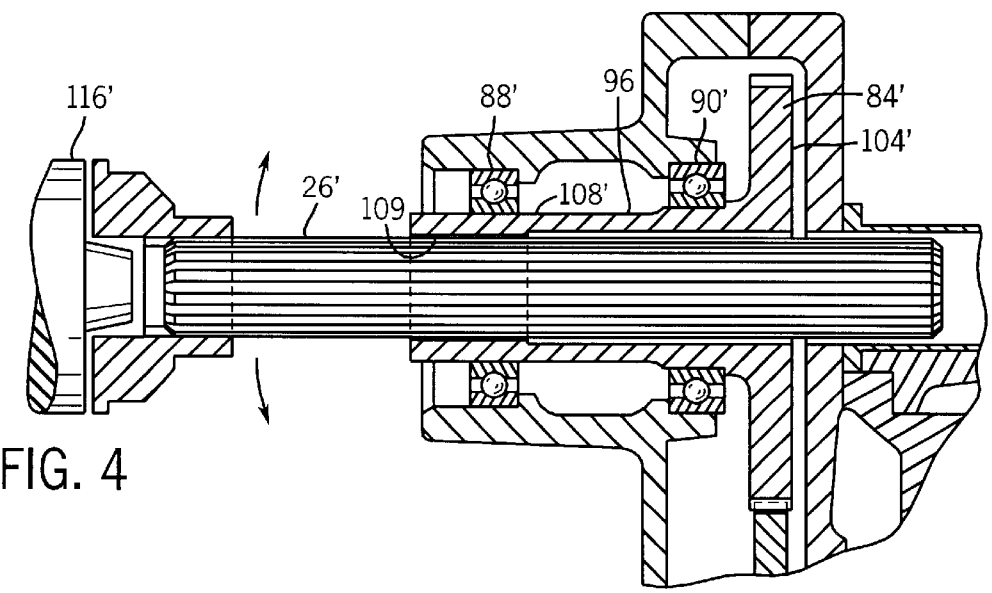
FIG. 4 shows a partial cross-sectional view of a second alternative spur gear and drive axle arrangement of the of the differential of FIG. 3 in which the spur gear includes an extended cylindrical portion having splines at an outer end thereof.

FIG. 4 shows an alternative spur gear and drive axle arrangement for one side of the vehicle. For convenience, this alternative arrangement is shown for only one tracked suspension. Nonetheless it is to be understood that the other three tracked suspensions are similarly arranged. In this arrangement upper spur gear 84' has a planar portion 104' fixed to hollow cylindrical portion 108', which is supported by bearings 88' and 90' in spaced apart relation on the cylindrical portion, one near the inner end of cylindrical portion 108' and one near the outer end of cylindrical portion 108'. A hole 96 passes through the middle of cylindrical portion 108' through which drive axle 26' passes. Splines 109 are provided on the inner surface of cylindrical portion 108' near its outer end that engage with mating splines on the outer diameter of drive axle 26'. These internal splines preferably do not extend the entire length of cylindrical portion 108', but are located only at an outer end. This arrangement provides enhanced bending rigidity to upper spur gear 84 by permitting bearing pairs 88' and 90' to be spaced farther apart, and thereby reduce the force applied to either bearing by a given radial load. Furthermore, by disposing the splines on upper spur gear 84' outward with respect to the teeth of upper spur gear 84', a greater adjustable range is provided for drive axle 26' than is provided for axle 26 in the embodiment of FIG. 3.

Inboard of splines 109, the inner portion of hole 96 preferably has a diameter larger than the overall outer diameter of drive axle 26' to permit some axial misalignment of drive axle 26' and spur gear 84', and is not engaged to shaft 26' to transmit power. This arrangement of upper spur gears 84' and 86' is particularly effective when drive axles are employed having a flexible coupling 116' disposed between, and coupling, the outer end of drive axle 26' and drive wheel 30. With a single flexible coupling at the outer end of drive axle 26', when drive wheel 30 flexes upward or downward under load, or when drive wheel 30 is axially misaligned with respect to rear differential 18, a bending force may be applied to drive axle 26' which is counteracted by bearings 88' and 90'. The farther these bearings are spaced apart, the lower the loads on each bearing due to the bending moment. By providing that the splines of cylindrical portion 108' and drive axle 26' mate over a relatively small distance compared with the overall length of cylindrical portion 108', and by providing clearance between drive axle 26' and the inner length of cylindrical portion 108', more free play is provided between axle 26' and cylindrical portion 108' than would be if the entire inner surface of cylindrical portion 108' was splined and engaged with drive axle 26', thereby permitting more axial misalignment between axle 26' and spur gear 84' before transmitting bending forces to spur gear 84'.

Figure 5:
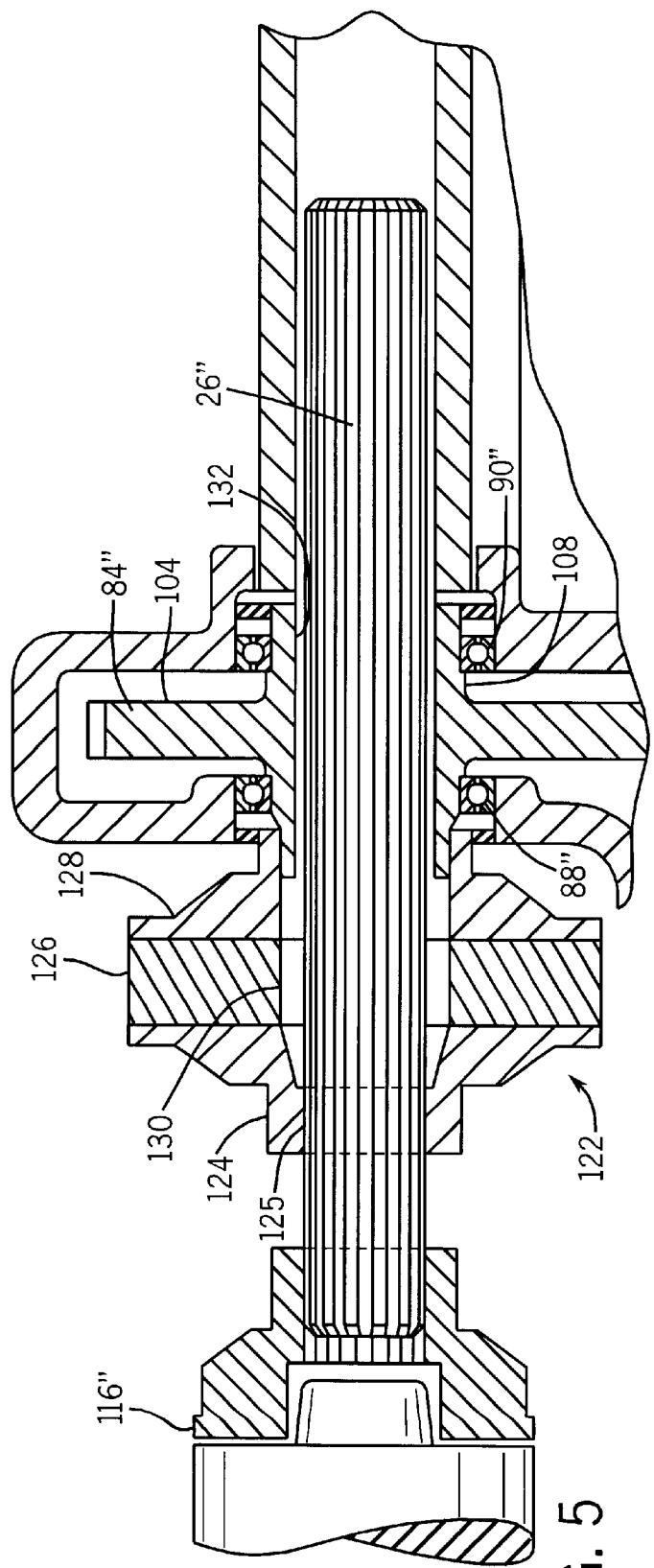
FIG. 5 is a partial cross-sectional view of the differential of FIG. 3 showing an alternative spur gear and drive axle arrangement in which the drive axle is slidably received in a flexible coupling mounted to the spur gear.

FIG. 5 illustrates another embodiment of upper spur gear 84 and drive axle 26 of FIG. 3 in which upper spur gear 84" includes a flexible coupling 122 having a splined outer collar 124, a cardan joint 126 and an inner collar 128. Inner collar 128 is fixed to upper spur gear 84" which, similar to upper spur gears 84 and 84' of FIGS. 3 and 4, is supported inside differential case 46 by two bearings 88" and 90" that are mounted on shoulders of upper spur gear 84". In contrast to upper spur gear 84' of FIG. 4, upper spur gear 84" of FIG. 5 has no internal splines to engage drive axle 26". Instead, outer collar 124 of flexible joint 122 which is rotationally coupled to upper spur gear 84" has a splined inner surface 125 that engages a splined length of drive axle 26". Flexible coupling 122 and upper spur gear 84" have inner holes 130 and 132. These holes are large enough to permit the inner end of drive axle 26" to deflect when flexible coupling 122 flexes without rubbing against the surface of inner holes 130 and 132 under normal operating conditions. As in the arrangements of FIGS. 3 and 4, the inner end of drive axle 26" can pass entirely through upper spur gear 84" and can slide with respect to upper spur gear 84". As in the previous examples, a flexible coupling 116" is preferably disposed between, and couples, drive axle 26" and its associated drive wheel (not shown).

Referring back to FIG. 3, the outer end of drive axle 26 is preferably connected to drive wheel 30 through a planetary gear arrangement. A similar planetary gear arrangement is preferably provided for the other three track drives, but has not been shown for convenience. Drive axle 26 is coupled to and drives sun gear 134 through flexible coupling 116. Sun gear 134 is part of planetary gear arrangement 136 that includes planetary gear carrier 138, three planet gears 140 (only one is shown for convenience) and ring gear 142 arranged in the conventional fashion. Ring gear 142, in turn, is coupled to and drives drive wheel 30. This arrangement provides a gear reduction at the drive wheel, thereby permitting a smaller diameter and faster turning drive axle 26 than could be provided with a direct coupling of drive axle 26 to drive wheel 30.

Figure 6:
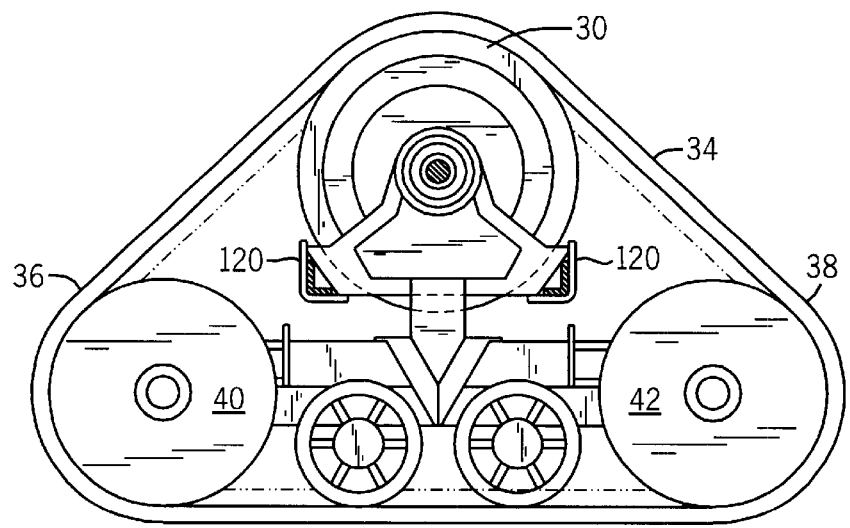
FIG. 6 is a side view of a tracked suspension of the agricultural vehicle of FIG. 1.

Drive wheel 30 is supported in rotation by bearings 144, 146 and 148, which are mounted on wheel support 150. Wheel support 150, in turn, is fixedly mounted to bracket 152, which is slidably mounted to beam 120 extending laterally from the vehicle. In the preferred embodiment, the track drive has two such brackets coupled to two beams 120 as shown in FIGS. 1 and 6. To adjust the track suspension inward or outward, mounting bolts (not shown) that hold flange 152 in position with respect to beam 120 are loosened or removed. The track drive can then be moved toward or away from the frame of vehicle 10 to a plurality of positions. As the track drive is so moved, drive shaft 26 will slide into or out of spur gear 84 as the case may be. Once the track drive is in the proper new position, the bolts are tightened and the vehicle may be driven away. A more detailed description of the track drive and its components may be found in U.S. application Ser. No. 09/399,870, entitled "An Improved Tracked Suspension" filed contemporaneously herewith and incorporated herein by reference for all that it teaches.

Thus, it should be apparent that there has been provided in accordance with the present invention a track vehicle track width adjustment that fully satisfies the objectives and advantages set forth above. Although the invention has been described in conjunction with specific embodiments thereof, it is evidence that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A rear suspension for a tracked vehicle, comprising:
   a differential case;
   a differential pinion gear for receiving rotational power from a prime mover;
   a driving gear gearingly coupled to and driven by the differential pinion gear;
   a differential carrier fixed to the driving gear;
   at least two pinion gears coupled to the differential carrier to permit relative rotation with respect to the differential carrier;
   two laterally opposed side gears adapted to rotate about a rotational axis and supported by the differential carrier for relative rotation with respect to the differential carrier and wherein the at least two pinion gears are adapted to drive the two laterally opposed side gears;
   first and second spur gears rotatable about the rotational axis wherein each of said first and second spur gears is coupled to and driven by a respective one of the two laterally opposed side gears;
   third and fourth spur gears with respective second and third rotational axes, the third and fourth gears engaged to and driven by the first and second spur gears, respectively, wherein the second and third rotational axes extend across a top portion of the differential case; and
   first and second splined drive axles each having an inner and an outer end and wherein the first drive axle splines are slidingly supported within and driven by the third spur gear and the second drive axle splines are slidingly supported within and driven by the fourth spur gear;
   wherein the first and second drive axle splines are of sufficient length and the rotational axes are sufficiently far apart to permit the inner ends of the first and second drive axles to be inserted through the third and fourth spur gears, respectively, and to lie side-by-side without axle-to-axle interference.

2. The rear suspension of claim 1, wherein the first, second, third and fourth spur gears are supported within the differential case.

3. The rear suspension of claim 2, wherein each of the third and fourth spur gears are disposed adjacent to openings in the differential case to permit the drive axles to pass through the differential case.

4. The rear suspension of claim 3, wherein the third and fourth spur gears include splines disposed outboard of the third and fourth spur gear teeth.

5. The rear suspension of claim 4, wherein the outer end of the first and second drive axles is coupled to a drive wheel for driving an endless track.

6. A rear suspension for a tracked vehicle, comprising:
   a differential case;
   a differential pinion gear for receiving rotational power from a prime mover;
   a differential gear set supported within the differential case;
   first and second spur gears rotatable about the rotational axis disposed on opposing sides of the differential gear set and differentially driven by the differential gear set;
   third and fourth spur gears rotationally engaged with and driven by the first and second spur gears, respectively, wherein the rotational axes of the third and fourth spur gears lie in a horizontal plane and are substantially parallel to each other; and
   first and second splined drive axles each having an inner and an outer end and wherein first drive axle splines are slidingly supported within and driven by the third spur gear and second drive axle splines are slidingly supported within and driven by the fourth spur gear;
   wherein the first and second drive axle splines are of sufficient length and the rotational axes are sufficiently far apart to permit the inner ends of the first and second drive axles to be inserted through the third and fourth spur gears, respectively, and to lie side-by-side without axle-to-axle interference.

7. The rear suspension of claim 6, wherein the third and fourth spur gears are disposed within and rotationally supported by the differential case.

8. The rear suspension of claim 7, further comprising first and second drive wheels coupled to and rotating coaxially with the outer ends of the first and second drive axles, respectively.

9. The rear suspension of claim 8, further comprising first and second endless tracks wrapped about and driven by first and second drive wheels, respectively.

10. The rear suspension of claim 9, wherein the first drive axle includes first inner and outer flexible couplings, the first inner flexible coupling being disposed in the first drive axle adjacent to the third spur gear, and the first outer flexible coupling being disposed in the first drive axle adjacent the first drive wheel, and wherein the second drive axle includes second inner and outer flexible couplings, the second inner flexible coupling being disposed in the second drive axle adjacent to the fourth spur gear, and the second outer flexible coupling being disposed in the second drive axle adjacent the second drive wheel.

* * * * *